United States Patent [19]

Lee, Jr.

[11] 4,123,410

[45] Oct. 31, 1978

[54] POLYPHENYLENE ETHER RESIN COMPOSITIONS OF REDUCED MELT VISCOSITY

[75] Inventor: Gim F. Lee, Jr., Albany, N.Y.

[73] Assignee: General Electric Company, Pittsfield, Mass.

[21] Appl. No.: 838,372

[22] Filed: Sep. 30, 1977

[51] Int. Cl.$^2$ .............................................. C08K 5/49
[52] U.S. Cl. .......................... 260/30.6 R; 260/31.8 M; 260/860; 260/874; 528/212
[58] Field of Search .................. 260/860, 874, 47 ET, 260/30 GR, 31.8 M

[56] References Cited
U.S. PATENT DOCUMENTS 3,703,564  11/1972  White ................................... 260/860

Primary Examiner—Lester L. Lee

Attorney, Agent, or Firm—Morgan, Finnegan, Pine, Foley & Lee

[57] ABSTRACT

There are provided thermoplastic polyphenylene ether resin compositions which comprise, in admixture, a major proportion of the polyphenylene ether resin, a minor proportion of a plasticizer at least sufficient to provide a plasticized composition after molding and poly(1,4-butylene terephthalate) or branched copolyester in an amount sufficient to reduce the melt viscosity of the composition without substantially reducing the heat distortion temperature and ductility properties thereof. In such compositions, there may also be present an A—B—A$^1$ copolymeric resin as an impact modifier. In preferred instances, where said poly(1,4-butylene terephthalate) is utilized in an amount in excess of about 5% by weight, the compositions will also contain a hydrogenated A—B—A$^1$ block copolymer.

14 Claims, No Drawings

POLYPHENYLENE ETHER RESIN COMPOSITIONS OF REDUCED MELT VISCOSITY

This invention relates to thermoplastic compositions containing a major proportion of polyphenylene ether resin. More particularly, this invention relates to polyphenylene ether resin compositions having an improved, that is, reduced melt vixcosity and which thus exhibit improved flow properties. The compositions of this invention include in admixture with the polyphenylene ether resin a plasticizer and a poly(1,4-butylene terephthalate or branched copolyester. The compositions may also include an impact modifier, such as A—B—A¹ copolymers of styrene for example, that is, polystyrene-polybutadiene-polystyrene.

BACKGROUND OF THE ART.

The polyphenylene ether resins are well known in the art as a class of thermoplastics which possess a number of outstanding physical properties making them useful in the field of molded plastics as well as other areas. Generally, they are prepared by oxidative and nonoxidative processes, such as are disclosed, for example, in Hay, U.S. Pat. Nos. 3,306,874 and 3,306,875; Stamatoff, U.S. Pat. Nos. 3,257,357, and 3,257,358; as well as Cizek, U.S. Pat. No. 3,383,435, all of which are incorporated herein by reference.

Although the polyphenylene ether resins, as indicated above, have many useful properties and they have been widely adapted for use in the field of molded plastics as well as other fields because of such properties, these materials still exhibit certain disadvantages, such as, for example, relatively high melt viscosity properties which make them difficult to manipulate in processes such as, for example, plastic molding and extruding processes and the like. Consequently, there exists a need to overcome this disadvantage with respect to polyphenylene ether resins. The present invention avoids the mentioned disadvantage.

DESCRIPTION OF THE INVENTION.

In accordance with the present invention, there is provided a thermoplastic composition comprising by weight, based on the total weight of the composition, a major proportion of polyphenylene ether resin having intimately admixed therewith a minor proportion of a plasticizer, and having present therein a poly(1,4-butylene terephthalate) or branched copolyester in an amount sufficient to reduce the melt viscosity of the composition without substantially reducing the heat distortion temperature and ductility properties thereof. There may be present also in the compositions of this invention as an impact modifier A—B—A¹ copolymer of styrene.

In the compositions of the invention the poly(1,4-butylene terephthalate) or branched copolyester is generally employed in a range of from about 2% to about 5% by weight, based on the total weight of the compositions. On the other hand, in those instances where the poly(1,4-butylene terephthalate) or branched copolyester is present in the compositions in excess of about 5%, by weight, the compositions also preferably contain a hydrogenated A—B—A¹ block copolymer in order to provide the best combination of properties.

In general, the polyphenylene ether resin employed in the compositions of this invention are of the family having structural units of the formula:

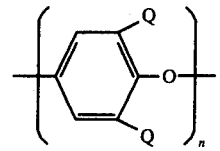

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Preferably, the polyphenylene ether resins are selected from those of the above formula wherein each Q is alkyl, most preferably having from 1 to 4 carbon atoms. Illustratively, members of this class include poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like.

Especially preferred is poly(2,6-dimethyl-1,4-phenylene)ether, preferably having an intrinsic viscosity of about 0.45 deciliters per gram (dl./g.) as measured in chloroform at 30° C.

The preparation of polyphenylene ether resins corresponding to the above formula is described in the abovementioned patents of Hay and Stamatoff.

The choice of a plasticizer to be used in the compositions of this invention is not critical and any of the conventional materials used for this purpose can be employed in carrying out the practice of the invention. Preferably, however, the plasticizer component will be selected from among phthalate and phosphate plasticizing materials, and especially phosphate plasticizers.

The phosphate plasticizer is preferably a compound of the formula:

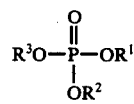

wherein R¹, R² and R³ are the same or different and are alkyl, haloalkyl, cycloalkyl, halocycloalkyl, aryl, haloaryl, alkyl substituted aryl, haloalkyl substituted aryl, aryl substituted alkyl, haloaryl substituted alkyl, hydroxyalkyl, hydroxyaryl, hydroxyalkaryl, halogen and hydrogen.

Examples include cresyl diphenyl phosphate, 2-ethylhexyl diphenyl phosphate, tricresyl phosphate, triisopropylphenyl phosphate, triphenyl phosphate, triethyl phosphate, dibutyl phenyl phosphate, diethyl phosphate, cresyl diphenyl phosphate, isooctyl diphenyl phosphate, tributyl phosphate, 2-ethylhexyl diphenyl phosphate, isodecyl diphenyl phosphate, isodecyl dicresyl phosphate, didecyl cresyl phosphate, tri-n-hexyl phosphate, di-n-octyl phenyl phosphate, di-2-ethylhexyl phenyl and tri-2-ethylhexyl phosphate or mixtures thereof. Especially preferred are aromatic phosphates, e.g., triphenyl phosphate.

Examples of phthalate plasticizers include dibenzyl phthalate, phenyl cresyl phthalate, diethyl phthalate, dimethyl phthalate, phenyl benzyl phthalate, butyl benzyl phthalate, butyl cyclohexyl phthalate, dibutyl phthalate, octyl cresyl phthalate, diphenyl phthalate, di-n-hexyl phthalate, diisohexyl phthalate, butyl octyl phthalate, butyl decyl phthalate, di-isooctyl phthalate, di-2-ethylhexyl phthalate, di-n-octyl phthalate, diisononyl phthalate, diisodecyl phthalate, di-2-propyl heptyl phthalate, di-n-nonyl phthalate, di-n-decyl phthalate and ditridecyl phthalate.

The plasticizer is added in amounts which will be sufficient to provide a plasticized composition that is, an amount at least sufficient to reduce the temperature of optimum extrusion by at least about 25° to about 100° F. as compared to the analogous unplasticized compositions. In general, the plasticizer is present in amounts ranging from at least about 1 to 49% by weight, based on the total weight of the composition including the resinous components combined, and, preferably is present in a range of from about 10% to about 25%, by weight.

The poly(1,4-butylene terephthalate) utilized in this invention is commercially available or can be easily made. In addition to units of butanediol and terephthalic acid, units can be present which are derived from minor amounts of other saturated condensation products of diols and dicarboxylic acids, or reactive derivatives thereof. In addition, copolyesters are useful in which branching is accomplished either by crosslinking through chemical linkages or in other known manners. More particularly, it is also possible to include cyclic aliphatic linkages, such as those derived from 1,4-dimethylolcyclohexane. In addition to the terephthalic acid units, minor amounts of other dicarboxylic acids, such as adipic acid, naphthalene dicarboxylic acid, isophthalic and o-phthalic acid can be used, e.g., from about 0.5 to about 15 mole % of the total acid units. The alkylene constituent can likewise constitute, in minor amounts, units derived from ethylene glyclol, propylene glycol, 1,4-butanediol, 1,6-hexanediol, 1,10-decanediol, the cyclo aliphatic diols, mixtures thereof and the like.

The branching component used in the branched copolyester will contain at least three ester forming groups. It can be one which provides branching in the acid unit portion of the polyester, or in the glycol unit portion, or be a hybrid. Illustrative of such branching components are tri or tetracarboxylic acids, such as trimesic acid, pyromellitic acid and lower alkyl esters thereof, and the like, or, preferably, polyols, and especially preferably tetrols, such as pentaerythritol, triols, such as trimethylolpropane, or dihydroxy carboxylic acids and hydroxydicarboxylic acid and derivatives, such as dimethyl hydroxy-terephthalate, and the like.

The relative amount of the branching component, if used, in the reaction mixture can vary, but is always preferably kept at a minor proportion, e.g., of up to 5 mole % maximum, for every 100 moles of the terephthalate units in the branched polyester. Preferably, the range of any branching component, if included in the esterification mixture, and generally, that included in the product, will be from 0.05 to 3 mole % based on the terephthalate units. Especially preferably, if used, it will comprise from about 0.1 to about 1 mole % based on the terephthalate component.

Processes for preparing such polyesters and branched copolyesters will be well known to those skilled in the art. The descriptions in U.S. Pat. Nos. 2,465,319, 3,047,539 and 3,692,244 are helpful.

The molecular weight of the polyester or branched copolyester should be sufficiently high to provide an intrinsic viscosity of about 0.6 to 0.2 deciliters per gram, and preferably 0.7 to 1.6 dl./g., measured for example, as a solution in a 60:40 mixture of phenol and tetrachloroethane at 30° C.

The plasticizer and impact modifier, where one is used, and poly(1,4-butylene terephthalate) will be present in the compositions of this invention in at least effective amounts to accomplish their required purpose, that is, to reduce the temperature of optimum extrusion to by at least about 25° to about 100° F. and to reduce the melt viscosity of the composition, respectively.

Impact modifiers which generally are blended intimately with the polyphenylene ether resin composition may be any of the elastomeric polymers and copolymers which are conventionally employed to improve impact properties in thermoplastic compositions. Illustratively, the impact modifiers can be selected from among elastomeric A—B—A$^1$ block copoylmers wherein terminal blocks A and A$^1$ are the same or different and are derived from a vinyl aromatic compound, e.g., styrene, α-methyl styrene, vinyl toluene, vinyl xylene, vinyl naphthalene, and the like, and center block B is derived from a conjugated diene, e.g., butadiene, isoprene, 1,3-pentadiene, 2,3-dimethyl butadiene, and the like.

These can be made by an organometallic initiated polymerization process using, for example, sodium or lithium metal or an organic derivative thereof. The diene monomers can be polymerized with a monofunctional or difunctional initiator, as is described in Kennedy et al, Interscience Publishers, Vol. 23, Part II (1969), pages 553-559. Other methods of preparation are described in Zelinski, U.S. Pat. No. 3,251,905 and Holden et al, U.S. Pat. No. 3,231,635, the disclosures of which are incorporated herein by reference.

The relative ratios of the polymer units in the A—B—A$^1$ block copolymers can vary broadly. It is preferred that the center block B have a molecular weight greater than that of the combined terminal blocks, however, to obtain optimum impact strength and solvent resistance. In general, the molecular weight of each of the respective terminal blocks will range from about 2,000 to about 100,000 and the molecular weight of the center block will range from about 65,000 to about 1,000,000.

Examples include the Kraton resins, commercially available from Shell Chemical Co., Polymers Division, e.g., K-1101 (polystyrene-polybutadiene-polystyrene), K-1102 (Polystyrene-polybutadiene-polystyrene), and K-1107 (polystyrene-polyisoprene-polystyrene).

The hydrogenated A—B—A$^1$ block copolymers are also well known. In general, these are block copolymers of the A—B—A$^1$ type in which terminal blocks A and A$^1$ are the same or different and, prior to hydrogenation, comprise homopolymers or copolymers derived from vinyl aromatic hydrocarbons and, especially, vinyl aromatics wherein the aromatic moiety can be either monocyclic or polycyclic. Examples of the monomers are styrene, α-methyl styrene, vinyl xylene, ethyl vinyl xylene, vinyl naphthalene, and the like. Center block B will always be derived from a conjugated diene, e.g., butadiene, isoprene, 1,3-pentadiene, and the like. Preferably, center block B will be comprised of polybutadiene or polyisoprene.

The preparation of hydrogenated A—B—A¹ block copolymers is described in Jones, U.S. Pat. No. 3,431,323, the disclosure of which is incorporated herein by reference.

Examples include the Kraton G resins, commercially available from Shell Chemical Co., Polymers Division, e.g., G-1650, G-GXT-0772, G-GXT-0782 and G-1652, and G-1651.

Radial teleblock copolymers of a vinyl aromatic compound, a conjugated diene and a coupling suitable impact modifiers for the compositions of this invention. These are branched polymers having segments, or blocks, comprised of a conjugated diene polymer, and a vinyl aromatic polymer, together with a coupling agent, wherein the copolymer structure chains of the diene polymer radiate outwards from a coupling agent, each chain terminating at its other end with a block of the vinyl aromatic polymer.

The radial teleblock copolymers are known in the art. They are described in ADHESIVES AGE, December, 1971, pages 15-20 and RUBBER WORLD, January, 1973 pages 27-32, which were incorporated herein by reference. The preparation of these copolymers is described in Zelinski et al, U.S. Pat. No. 3,281,383, also incorporated herein by reference.

Examples of commercially available radial teleblock copolymers are the Solprene resins of Phillips Petroleum Company designated as Solprene 406 (containing about 60 parts by weight of butadiene units and about 40 parts by weight of styrene units), Solprene 411 (containing about 70 parts by weight of butadiene units and about 30 parts by weight of styrene units), Solprene 414 containing about 60 parts by weight of butadiene units and about 40 parts by weight of styrene units), Solprene 417 (containing about 20 parts by weight of butadiene units and about 80 parts by weight of styrene units), and S411P (containing about 70 parts by weight of butadiene units and about 30 parts by weight of styrene units). These materials also include a relatively minor amount of coupling agent, e.g., less than 1 part by weight of coupling agent per 100 parts of polymer.

Also included are hydrogenated radial teleblock copolymers of a vinyl aromatic compound, a conjugated diene and a coupling agent, such as Solprene 512, commercially available from Phillips Petroleum Co.

The impact modifier can also be selected from acrylic resin modified diene rubber containing resins. Preferably, these will be of the group consisting of a resinous composition of a poly(alkylene methacrylate) grafted on to a butadiene-styrene copolymer backbone or an acrylonitrile-butadiene-styrene terpolymer backbone, or a resinous composition of a mixture of a poly(alkylmethacrylate) and a butadiene-styrene copolymer or an acrylonitrile-butadiene-styrene terpolymer.

A preferred commercially available impact modifier of this type is Acryloid KM611, sold by Rohm and Haas Co., which is an acrylic/styrene/styrene-butadiene terpolymer.

The aforementioned acrylic resin modified elastomers can be prepared by well known techniques, such as those described in U.S. Pat. Nos. 2,943,074 and 2,857,360, which are incorporated herein by reference.

The impact modifier can also be a graft copolymer of a vinyl aromatic compound and a diene, preferably comprising from about 75 to about 10% by weight of a vinyl aromatic monomer and from about 25 to about 90% by weight of a conjugated diene. By way of illustration, the aromatic monomer can be selected from among styrene, α-methyl styrene, vinyl toluene, vinyl xylene, and the like, and the diene can be selected from among butadiene, isoprene, and the like. Graft copolymers of styrene and styrene-butadiene are preferred.

An examples of a preferred commercially available graft copolymer is Blendex 525, sold by Marbon Chemical Co.

As mentioned hereinbefore, in those instances where the poly(1,4-butylene terephthalate) or copolyester is employed in an amount greater than about 5% by weight, a hydrogenated block copolymer will be preferably present in the compositions of this invention. This is preferred because the presence of an amount of poly(1,4-butylene terephthalate) or copolyester in excess of 5% while beneficially reducing the melt viscosity of a composition in accordance with the invention tends to have an adverse effect upon the heat distortion temperature and ductility properties thereof.

It is to be noted in this regard that test data appear to indicate generally that not more than about 15% by weight at the most of poly(1,4-butylene terephthalate) or copolyester should be employed in the compositions of this invention, although there is nothing critical about this stated upper amount. On the other hand, as the amount thereof in the compositions of this invention is increased, the heat distortion temperature and ductility properties of the compositions tend to be somewhat adversely affected and to overcome this it is advisable to increase the amount of hydrogenated A—B—A¹ block copolymer used.

In any event the optimum amounts of poly(1,4-butylene-terephthalate) or copolyester and hydrogenated A—B—A¹ block copolymer, to be used are readily determined by routine experimentation.

In addition, the compositions of this invention may include other optional constituents such as minor amounts of polyethylene, tridecylphosphite, mineral reinforcing agents such as zinc oxide, zinc sulfide and various types of fillers such as clays and the like.

The compositions of this invention can be prepared by conventional methods. Preferably, each of the ingredients is added as part of a blend premix, and the blend is passed through an extruder at an extrusion temperature of from about 500 to about 625° F., dependent on the needs of the particular composition. The strands emerging from the extruder may be cooled, chopped into pellets, and molded or otherwise worked to any desired shape.

DESCRIPTION OF THE PREFERRED EMBODIMENTS.

In order to illustrate the present invention more fully, the following examples thereof are set forth. It is to be understood that these examples are illustrative only and are not to be construed as limiting the invention to the particular embodiments set forth therein. In the examples all parts and percents are by weight unless otherwise indicated.

Units for the properties shown in the examples are as follows unless otherwise indicated:
Tensile Yield Strength (psi)
Tensile Ultimate Strength (psi)
Tensile Elongation (%)
Notched Izod Impact Strength (ft. lbs./in. notch)
Heat Deflection or Distortion Temperature (° F.)
Melt Viscosity at 540° F., 1500 sec$^{-1}$ (poise)

Gardner Impact Strength (in. lbs.)

EXAMPLE 1

A polyphenylene ether composition is made by mixing together 78 grams of poly(2,6-dimethyl-1,4-phenylene)ether, 22 grams of triphenyl phosphate plasticizer and 5 grams of an impact modifier, K-1101 which is a polystyrene-polybutadiene-polystyrene block copolymer manufactured by Shell Chemical Company, Polymers Division. In addition there is incorporated into the mixture 1.5 grams of polyethylene, 0.5 gram of tridecyl phosphite and 0.15 gram each of zinc sulfide and zinc oxide, respectively. The constituents are thoroughly mixed together at room temperature (about 30° C.) and subsequently extruded through a screw extruding device at a temperature of about 580° F. The extrudate is then chopped into pellets and molded into test bars at a temperature of about 520° F. and evaluated to determine the mechanical properties thereof. The properties of the material so prepared are set forth in the following Table and identified as the control.

The procedure is repeated in preparing a second composition except that in addition to the constituents utilized in the control, the second composition also contains 5.2 grams of poly(1,4-butylene terephthalate) sold under the trade name of Valox 310 by the General Electric Company, Plastics Business Division. After extrusion, the physical properties of the second composition containing the Valox 310 are likewise determined. The compositions and properties are set forth in the following Table.

Table 1.

| Compositions (parts by weight) | 1 | 1A* |
|---|---|---|
| poly(2,6-dimethyl-1,4-phenylene) ether | 78 | 78 |
| triphenyl phosphate | 22 | 22 |
| poly(1,4-butylene terephthalate) | 5.2 | |
| impact modifier** | 5 | 5 |
| polyethylene | 1.5 | 1.5 |
| tridecyl phosphite | 0.5 | 0.5 |
| zinc sulfide | 0.15 | 0.15 |
| zinc oxide | 0.15 | 0.15 |
| Properties | | |
| Tensile yield, psi | 7500 | 8100 |
| Tensile strength, psi | 7400 | 7800 |
| Elongation, % | 99 | 89 |
| Izod impact, ft.lbs/in.notch | 4.1 | 6.4 |
| Heat distortion temp. at 266 psi, ° F. | 195 | 201 |
| Melt viscosity at 540° F., 1500 sec$^{-1}$ (poise) | 900 | 1700 |

Composition of Poly(2,6-dimethyl-1,4-phenylene) ether, Triphenyl phosphate and poly(1,4-butylene terephthalate)

*Control
**polystyrene-polybutadiene-polystyrene block copolymer, Shell Chemical Co., Polymers Div., Product Designation K-1101.

As can be seen from Table 1, the melt viscosity of the composition of this invention containing poly(1,4-butylene terephthalate) is substantially reduced as compared to the control. On the other hand, the heat distortion temperature of the composition of this invention is only slightly less than the control and the tensile elongation is actually increased.

EXAMPLES 2-3

The composition of this invention as in Example 1 is again made except it is used as the comparison composition and contains 10 grams of poly(1,4-butylene terephthalate). The procedure is once again repeated except that 15 grams of Kraton G-1651, a hydrogenated styrene-butadiene-styrene block copolymer are added to the composition as an impact modifier instead of K-1101. The compositions and their mechanical properties are set forth in the following Table.

Table 3.

| Compositions (parts by weight) | 2* | 3 |
|---|---|---|
| poly(2,6-dimethyl-1,4-phenylene) ether | 78 | 78 |
| triphenyl phosphate | 22 | 22 |
| poly(1,4-butylene terephthalate) | 10 | 10 |
| impact modifier | 5** | 15*** |
| polyethylene | 1.5 | 1.5 |
| tridecyl phosphite | 0.5 | 0.5 |
| zinc sulfide | 0.15 | 0.15 |
| zinc oxide | 0.15 | 0.15 |
| Properties | | |
| Tensile yield, psi | 6800 | 5600 |
| Tensile strength, psi | 3800 | 5900 |
| Elongation, % | 27 | 76 |
| Izod impact, ft. lbs./in.notch | 2.8 | 21.4 |
| Gardner impact, in. lbs. | 10 | 165 |

Compositions of Poly(2,6-dimethyl-1,4-phenylene) ether, Triphenyl phosphate and an increased amount of Poly(1,4-butylene terephthalate)

*Comparison composition.
**polystyrene-polybutadiene-polystyrene block copolymer, Shell Chemical Co., Polymer Div., Product Designation K-1101.
***hydrogenated styrene-butadiene-styrene block copolymer, Shell Chemical Co., Polymers Div., Product Designation Kraton G - 1652.

As can be seen from the data in Table 3, both the notched Izod impact strength and the Gardner impact strength of Example 4 containing Kraton G-1652 are substantially increased in comparison to that of Example 3 which does not contain this material. It is also to be noted that both the tensile ultimate strength and the tensile elongation are likewise improved while at the same time the tensile yield strength is not materially adversely effected.

Numerous modifications and variations of the present invention can be made without departing from the spirit and scope thereof. For example, instead of using poly(2,6-dimethyl-1,4-phenylene)ether, poly(2,6-diethyl-1,4-phenylene)ether, and the like, can be used. Instead of triphenyl phosphate, tricresyl phosphate, dibenzyl phthalate, and the like can be used. Instead of poly(1,4-butylene terphthalate), a branched copolyester of butanediol and terephthalic acid including a small amount of pentaerythritol or of trimesic acid, and the like, can be used. It is to be understood therefore, that this invention is not to be limited to the particular embodiments described herein except as defined in the appended claims.

It is claimed:

1. A thermoplastic composition comprising by weight, based on the total weight of the composition, a major proportion of polyphenylene ether resin having intimately admixed therewith a minor proportion of a plasticizer; and poly(1,4-butylene terephthalate) or a copolyester thereof with a minor amount of a branching composition in an amount sufficient to reduce the melt viscosity of said composition without substantially reducing the heat distortion temperature and ductility properties thereof.

2. A composition as defined in claim 1 wherein the polyphenylene ether resin has the formula:

UNITED STATES PATENT AND TRADEMARK OFFICE
CERTIFICATE OF CORRECTION

PATENT NO. : 4,123,410
DATED : October 31, 1978
INVENTOR(S) : Gim F. Lee, Jr.

It is certified that error appears in the above—identified patent and that said Letters Patent are hereby corrected as shown below:

Column 5, Line 12, after "coupling" insert --are also--

*Signed and Sealed this*

*Seventeenth* Day of *April 1979*

[SEAL]

Attest:

RUTH C. MASON
*Attesting Officer*

DONALD W. BANNER
*Commissioner of Patents and Trademarks*